W. H. BRISTOL.
AUTOMATICALLY SYNCHRONIZED ENTERTAINMENT DEVICE.
APPLICATION FILED MAY 21, 1915.
1,234,127.
Patented July 24, 1917.
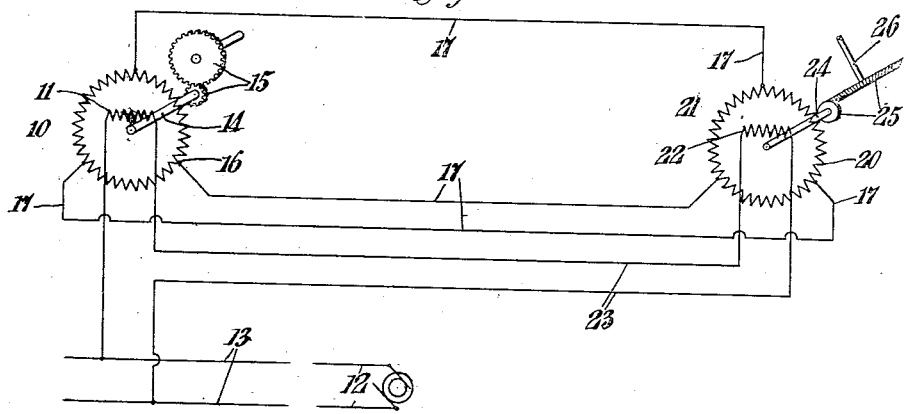
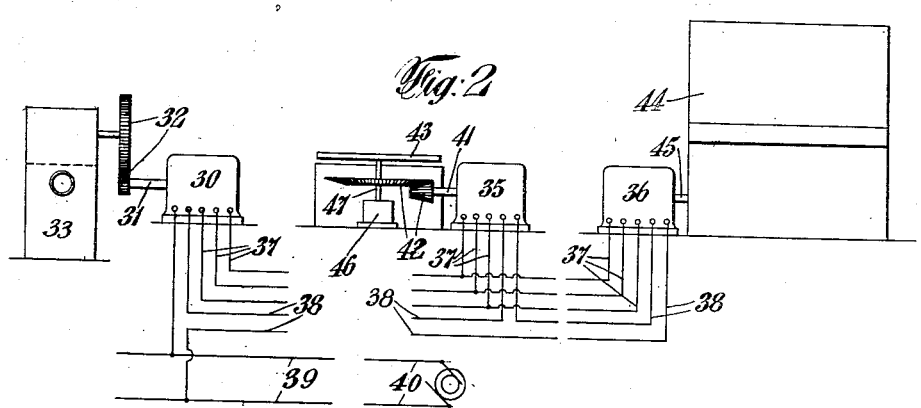
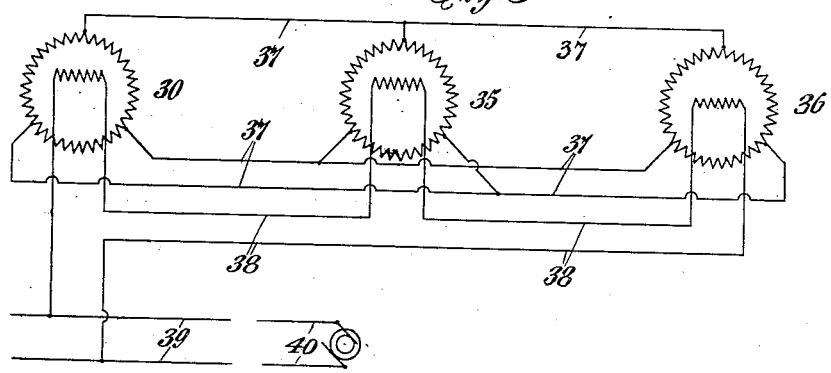
INVENTOR
William H. Bristol
BY
*[signature]*
ATTORNEY

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

AUTOMATICALLY-SYNCHRONIZED ENTERTAINMENT DEVICE.

1,234,127.  Specification of Letters Patent.  Patented July 24, 1917.

Application filed May 21, 1915. Serial No. 29,520.

*To all whom it may concern:*

Be it known that I, WILLIAM H. BRISTOL, a citizen of the United States, and a resident of Waterbury, in the county of New Haven and State of Connecticut, have invented certain new and useful Improvements in Automatically - Synchronized Entertainment Devices, of which the following is a specification.

The invention relates to improvements in automatically synchronized apparatus, more particularly to its adaptation in the simultaneous operation of a plurality of entertainment mechanisms such as motion picture machines, sound reproducing machines, piano-players, musical instruments and the like.

It has for its object to so control the actuation of two or more devices of this character that the same will operate in perfect synchronism without adjustment or attention of the operator after having once been properly adjusted. To this end, the invention consists in rotating an electrical transmitting member by one of the said devices and controlling thereby through the medium of a corresponding receiving member or members, the rotation of one or more of said devices for the operation of the same.

In the accompanying drawings which illustrate the invention—

Figure 1 illustrates diagrammatically the general arrangement of the apparatus.

Figs. 2 and 3 illustrate the general arrangement and connections of a synchronized motion picture machine, sound reproducing machine and piano player.

Similar characters of reference designate corresponding parts throughout the several views.

Referring to Fig. 1 of the drawings, 10 designates the transmitting member which consists, as shown in its simplified form, of a revolving, single-phase, bi-polar field or rotor 11 connected to a source of alternating current 12 through mains 13. This rotor or field may be revolved in any convenient manner from one of the devices to be synchronized, as through a shaft 14 and gearing 15, if the latter be required to provide a suitable speed of rotation. Surrounding the rotor 11 is a stator 16 having a distributed winding which may be similar to that of an induction motor. From three equi-distant points thereof suitable leads 17 run to three similarly disposed points of a corresponding three-phase stator winding 20 of a receiving device 21 and which device is precisely similar to the transmitting device 10 having, also, a single-phase, bi-polar revolving field or rotor 22. The latter through leads 23, is connected in series with the rotor 11; and as the former is rotated, the shaft 24 of the latter will synchronously follow the rotation of the former. Rotation of shaft 24 may be communicated directly, or, for example, through gears 25, to a driving shaft 26 which in turn will rotate at the proper speed apparatus connected thereto and the rotation of which apparatus will thus be maintained in synchronism with that of the driving apparatus for the transmitting member.

This results from the fact that the alternating current prevailing in the rotor of the transmitter will induce currents in the three wires of the stator, the relative values of which currents depend upon the position of the field or rotor. Said currents, in turn, produce a magnetic flux in the receiver to cause its rotor to be drawn into the same angular position as the field of the transmitter and which will revolve in accordance with the rotation of its stator. The stator coils are thus energized entirely by induction from the rotor, and movement of the latter produces a field in the stator which polarizes it in the direction of the rotor axis and induces voltage in the stator coils, the same being transmitted to the receiver stator coils and duplicating in them the same polarity and voltage conditions, but in reverse direction, or vice versa according to the arrangement of the stator connections. The rotor of the receiver, in turn, being energized in the same direction as that of the transmitter, is reacted upon by the polarized stator until their magnetic axes coincide. Any difference in the position of the transmitter and the receiver rotors causes a difference of potential between them with a consequent flow of current and resultant torque, so that the receiver rotor will closely and smoothly follow the movement of the transmitter rotor.

In Figs. 2 and 3, a transmitter member 30 is adapted to be driven through shaft 31 and intermediate gearing 32, from a motion picture machine 33 which is operated either by power or manually, as is well understood, and preferably by power to insure uniform speed. Two receiving members 35 and 36 are connected to the transmitter 30, the stator windings thereof through leads 37 being connected in parallel, and the rotor windings through leads 38 in series and through mains 39 to a source of alternating current 40. The receiver 35 drives through a shaft 41 and suitable gearing 42, the turn table 43 of a sound-reproducing machine, the gearing being so selected with respect to the rotation of receiver shaft 41, and which in turn is dependent upon the speed of the transmitter 30, that the normal and proper speed of the turn table 43 is obtained. This permits of a proper reproduction of the sound while permitting also of the proper rate of running the film through the motion picture machine. The receiver 36 controls in similar manner the operation of a piano player, organ or the like 44 through the rotation of a shaft 45 connected therewith. If required, auxiliary driving means such as a spring or other independently acting motor 46 may be provided to drive either or both the sound reproducing machine or the piano player, for example as by attaching the same to the turn table shaft 47 of the former.

I claim:—

1. Entertainment or like apparatus, comprising: a plurality of continuously rotatable entertainment devices adapted to be synchronously operated; a source of alternating current; an electrical transmitting member rotatable by one of said devices; and a rotatable electrical receiving member governing the rotation of another of said devices, the said transmitting and receiving members each comprising a primary and a secondary winding, one of which is provided with a rotatable element, and one set of windings being connected to said source of alternating current and the other interconnected for the purpose of producing equalizing currents therein when the rotatable elements do not occupy corresponding relative positions.

2. Entertainment or like apparatus, comprising: a plurality of continuously rotatable entertainment devices adapted to be synchronously operated; a source of alternating current; an electrical transmitting member rotatable by one of said devices; a rotatable electrical receiving member governing the rotation of another of said devices, the said transmitting and receiving members each comprising a primary and a secondary winding, one of which is provided with a rotatable element, and one set of windings being connected to said source of alternating current and the other interconnected for the purpose of producing equalizing currents therein when the rotatable elements do not occupy corresponding relative positions; and speed changing means included between the transmitting member and its rotating device, and speed changing means included between the said receiving member and the device whose rotation it governs.

3. Entertainment or like apparatus, comprising: a plurality of continuously rotatable entertainment devices adapted to be synchronously operated; a transmitting member rotatable by one of said devices and comprising a single-phase rotor, a stator surrounding said rotor and having a three-phase winding; a rotatable receiving member governing the rotation of another of said devices and comprising a single-phase rotor connected in series with the rotor of the transmitting device, a stator surrounding said receiving member rotor and having a three-phase winding; a source of alternating current feeding said rotors; and a lead from each phase winding of the transmitting member stator connecting same to a corresponding point of the winding of a receiving member stator.

4. Entertainment or like apparatus, comprising: a motion picture projection machine; a transmitting member connected thereto to be rotated thereby and comprising a single-phase rotor, a stator surrounding said rotor and having a three-phase winding; a sound reproducing machine; a receiving member connected thereto to control the speed of rotation thereof and comprising a single-phase rotor connected in series with the rotor of the transmitting device, a stator surrounding said receiving member rotor and having a three-phase winding; a source of alternating current feeding said rotors; and a lead from each phase winding of the transmitting member stator connecting same to a corresponding point of the winding of the receiving member stator.

5. Entertainment or like apparatus, comprising: a motion picture projection machine; a transmitting member connected thereto to be rotated thereby and comprising a single-phase rotor, a stator surrounding said rotor and having a three-phase winding; a sound reproducing machine and a piano-player or the like; a receiver member connected to said sound reproducing machine, and a receiver member connected to said piano-player or the like to control the speed of rotation thereof and each comprising a single-phase rotor connected in series with the rotor of the transmitting device, and a stator surrounding said receiving member rotors and having a three-phase winding; a source of alternating current feeding said rotors; and a lead from each phase winding from the transmitting member stator connecting same to a corresponding point of the respective windings of the receiving member stator.

Signed at New York, in the county of New York, and State of New York, this 20th day of May, A. D. 1915.

WILLIAM H. BRISTOL.